Figure 1:
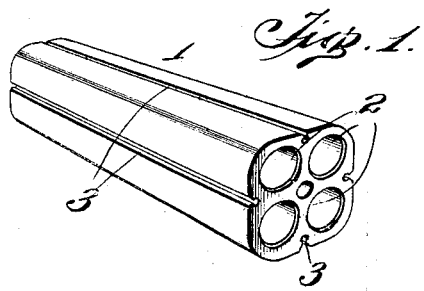

No. 764,779. PATENTED JULY 12, 1904.
M. J. STONE.
CONDUIT.
APPLICATION FILED SEPT. 25, 1902.
NO MODEL.

Witnesses
L. G. Handy
R. B. Cavanagh

Inventor
Martyn J. Stone
By Mason Fenwick & Lawrence
Attorneys

No. 764,779. Patented July 12, 1904.

UNITED STATES PATENT OFFICE.

MARTYN J. STONE, OF SCRANTON, PENNSYLVANIA.

CONDUIT.

SPECIFICATION forming part of Letters Patent No. 764,779, dated July 12, 1904.

Application filed September 25, 1902. Serial No. 124,853. (No model.)

*To all whom it may concern:*

Be it known that I, MARTYN J. STONE, a citizen of the United States, residing at Scranton, in the county of Lackawanna and State of Pennsylvania, have invented certain new and useful Improvements in Conduits; and I do hereby declare the following to be a full, clear, and exact description of the invention, such as will enable others skilled in the art to which it appertains to make and use the same.

This invention relates to certain new and useful improvements in conduits of the type employed for carrying underground wires.

It is the intention of the present invention to provide a conduit composed of glass, clay, or any suitable non-conducting material which shall be capable of use in conjunction with a group of like conduits without resorting to the use of studs, sleeves, or like fastening means.

The invention also contemplates so grooving or forming the outer faces or surfaces of the conduit that when used in a group or groups, as above recited, the several members of such group or groups may be joined together through the medium of any plastic or binding material, such as cement, such binding material to be placed in the grooves referred to forming the only means necessary to hold the members of the group or groups in their proper position relative to each other.

A further object of the invention is to provide conduits which may be easily handled and quickly adjusted or centered relative to each other and used in groups without the necessity of resorting to auxiliary means generally employed in conduits for telephone-wires heretofore used.

In conduits of this type heretofore used it has been the common practice to make the sides or faces thereof perfectly smooth and even, and this formation when it is desired to join such conduits in a group has rendered it necessary to employ various centering and locking or fastening means, such as dowel-pins, and insert them into the ends of the conduits in order to bind them together, and it is to avoid this that the present structure is designed.

While I have herein shown and described my preferred form of conduit, it will be evident and is to be understood that there can be modification in several respects as to the minor details of structure without departing from the essence or spirit of the invention or sacrificing any of the advantages thereof.

To the accomplishment of the above-recited ends, the invention consists in forming the surface of a conduit with grooves adapted to receive and retain cement or other like fastening means.

It also consists in the particular construction, combination, and arrangement of parts, as will be hereinafter described in the specification, illustrated in the drawings, and set forth in the claims.

Figure 2:
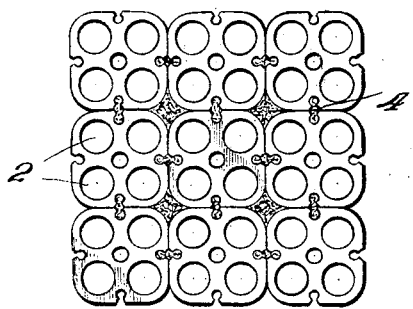
Figure 4:
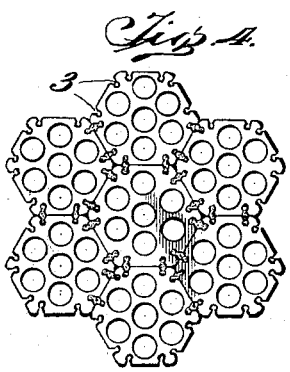
Figure 5:
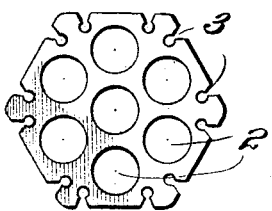
Figure 3:
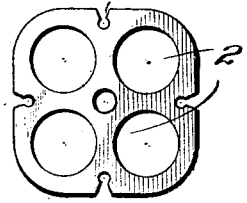

Referring to the drawings, Figure 1 is a perspective view of my improved conduit. Fig. 2 is an end view of a part of the conduits used in a group and illustrating the manner in which they are mounted and joined relative to each other; and Fig. 3 is an enlarged end view of my improved conduit, showing the preferred formation of the curves on the surfaces thereof. Fig. 4 shows a number of conduits of modified form mounted in a group. Fig. 5 is an end view of such modified form.

Referring now to the drawings in detail, and in particular to Fig. 1 thereof, the numeral 1 designates the body portion of the conduit, which may be formed of glass, vitrified clay, common clay, or any suitable like but non-conducting material of the character usually employed in the manufacture of articles of this type. In the figure above referred to I have shown my conduit substantially square in cross-section, the ends thereof being slightly rounded for the purpose to be hereinafter set forth. The conduit is provided with any suitable number of channels or cable-holes 2 for the reception and support of the wires adapted to pass through the same. Formed on the outer surface of the body portion of the conduit, and preferably extending longitudinally the entire distance thereof, is a groove, as at 3. In Fig. 1 I have shown a groove formed in each of the four faces of the conduit; but it will of course be understood that any desired number of grooves may be employed, as shown in Fig. 5, illustrating a modification, wherein it is seen that two grooves are formed on each face. This grooving or fluting of the surfaces of the conduit forms an important and essential feature of the invention, and while such grooving may be of any desired shape still I have found that for practical purposes the form of the groove illustrated in the accompanying drawings is preferable.

When it is desired to use the conduits in a group, as for the reception of a large number of wires—for instance, telephone wires or cables—the conduits are placed in proper position relative to each other and the cement or binding material 3 is placed or forced into the grooves 2. The next conduit of the group is then placed upon the conduit containing the cement in such manner that the grooved or fluted portions of each conduit correspond and are in line with the adjacent grooves. In this way the cement will be forced into the groove of the second conduit and acting as a key when hardened will bind the members firmly in position. When the ends or edges of the conduit are rounded, as shown in Fig. 1, and the conduits are mounted in groups, the cement or binding material may also be used as a filling for the space formed when the conduits are mounted as shown in Fig. 2.

It will be evident that when conduits formed as above described are mounted in groups they are held securely in place without the use of auxiliary means and present very little liability of breakage or damage. By cementing the grooves together perfectly air-tight piping is formed and a conduit is formed which will prevent the entrance of air and the consequent damage to cables or wires held therein. The conduits of the character heretofore used having smooth surfaces were cemented together, the only binding or holding means aside from the dowel-pin commonly in use was the tensile strength of the cement, while in my structure in order to detach one of the conduits from groups it is necessary to break the cement squarely at the point of the juncture. There are also many other advantages incident to a structure of this character; but they are so evident that it will be unnecessary to specifically set them forth.

It will further be observed that conduits constructed according to my improvements may be quickly and accurately placed in alinement and held in such position by any suitable means—such, for instance, as thin pieces of wood placed in the grooves when they are joined together. It is evident that this would retain them securely in place until the cement had hardened sufficiently along the entire length. The workman would then be able to perform his labors with greater rapidity, as there would be no danger of accidentally forcing the conduits out of their proper alinement before the cement had obtained a sufficient degree of hardness.

Having thus fully described my invention, what I claim as new, and desire to secure by Letters Patent of the United States, is—

1. The combination with conduit-sections arranged side by side and exteriorly provided with registering grooves undercut or reduced at their entrance or opening, of a double key conjointly engaging the grooves of said respective sections for locking them together.

2. The combination, with conduit-sections arranged side by side and exteriorly provided respectively with longitudinal registering grooves extending from end to end and undercut or having a reduced longitudinal entrance or opening, of cement or other material conjointly engaging the grooves of the respective sections for retaining the same together.

3. The combination, with conduit-sections arranged side by side and exteriorly provided with registering longitudinal grooves extending from end to end and undercut or having a reduced entrance or opening, of a double key conjointly engaging the respective grooves of said sections for retaining the same together.

4. The combination, with a plurality of conduit-sections arranged side by side and exteriorly provided with longitudinal grooves extending from end to end, said grooves being on median lines with respect to the sides of the conduit so that the grooves of the different sections register and being undercut or having reduced longitudinal entrances or openings, of a double key conjointly engaging the respective grooves of said sections for retaining the same together.

In testimony whereof I hereunto affix my signature in presence of two witnesses.

MARTYN J. STONE.

Witnesses:
W. W. BAYLOR,
KATHERINE D. MULROONY.